(12) United States Patent
Smith et al.

(10) Patent No.: US 6,972,163 B2
(45) Date of Patent: Dec. 6, 2005

(54) BATTERY COVER ASSEMBLY

(75) Inventors: Donald G. Smith, Mocksville, NC (US); Devin D. Biehler, Statesville, NC (US)

(73) Assignee: Ingersoll-Rand Company, Montvale, NJ (US)

( * ) Notice: Subject to any disclaimer, the term of this patent is extended or adjusted under 35 U.S.C. 154(b) by 309 days.

(21) Appl. No.: 10/243,133

(22) Filed: Sep. 13, 2002

(65) Prior Publication Data

US 2004/0053128 A1   Mar. 18, 2004

(51) Int. Cl.[7] ............................. H01M 2/04; H01M 2/10
(52) U.S. Cl. ......................... 429/65; 429/96; 429/159; 429/177
(58) Field of Search ............................. 429/65, 99, 100, 429/156, 159, 176, 177, 96, 97

(56) References Cited

U.S. PATENT DOCUMENTS

| | | | | |
|---|---|---|---|---|
| 3,061,662 A | * | 10/1962 | Toce et al. | 429/99 |
| 5,567,542 A | * | 10/1996 | Bae | 429/99 |
| 5,645,954 A | * | 7/1997 | Tamaru | 429/100 |
| 2001/0049057 A1 | * | 12/2001 | Frustaci et al. | 429/176 |

* cited by examiner

Primary Examiner—Stephen J. Kalafut
(74) Attorney, Agent, or Firm—Michael Best & Friedrich LLP

(57) ABSTRACT

A battery cover assembly for use with a battery cell structure having spaced apart positive and negative terminals along a given surface. The cover assembly includes a cover surface having a relief area and a wall depending from the cover surface. A support structure supports the cover surface relative to the given surface of a desired battery cell structure such that the open relief area is aligned with the negative terminal. At least a portion of the wall extends between the positive and negative terminals and the cover surface covers the positive terminal.

10 Claims, 3 Drawing Sheets

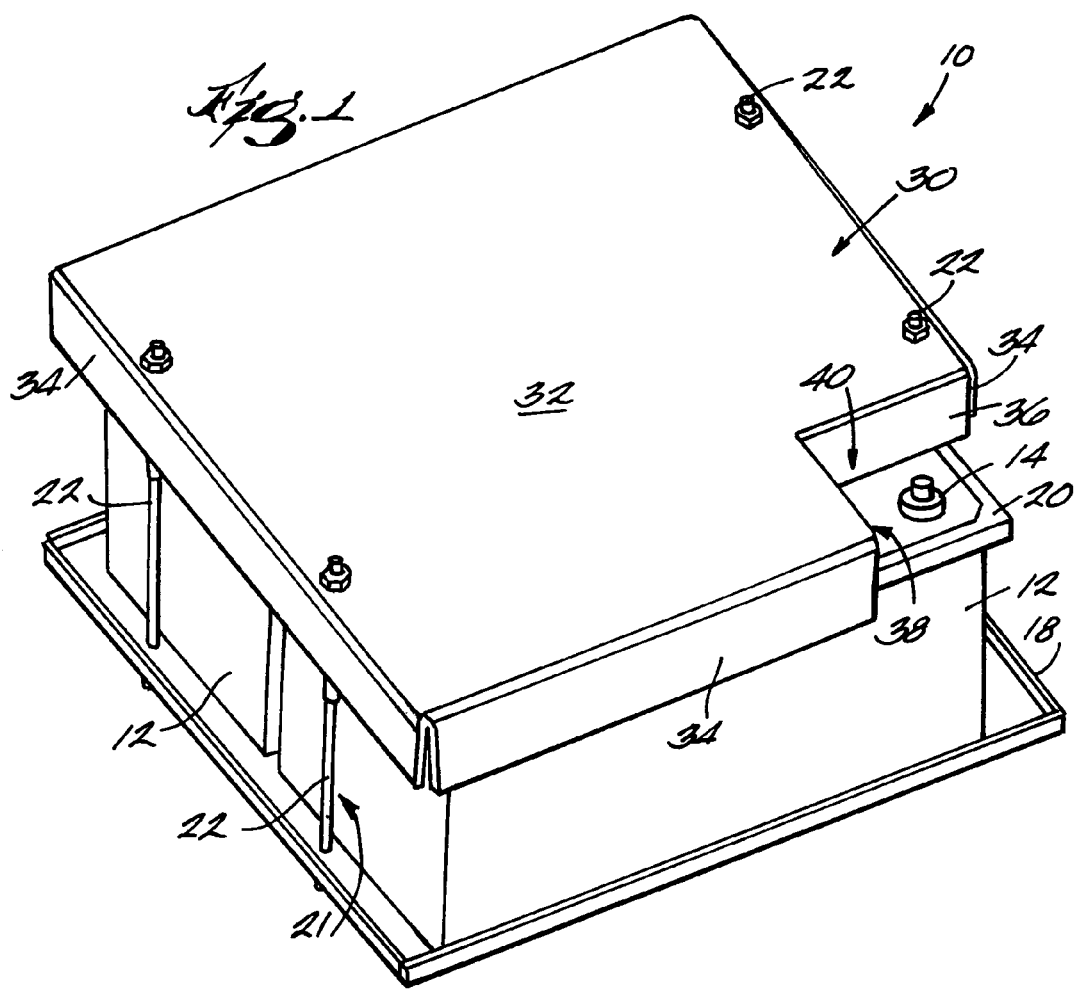
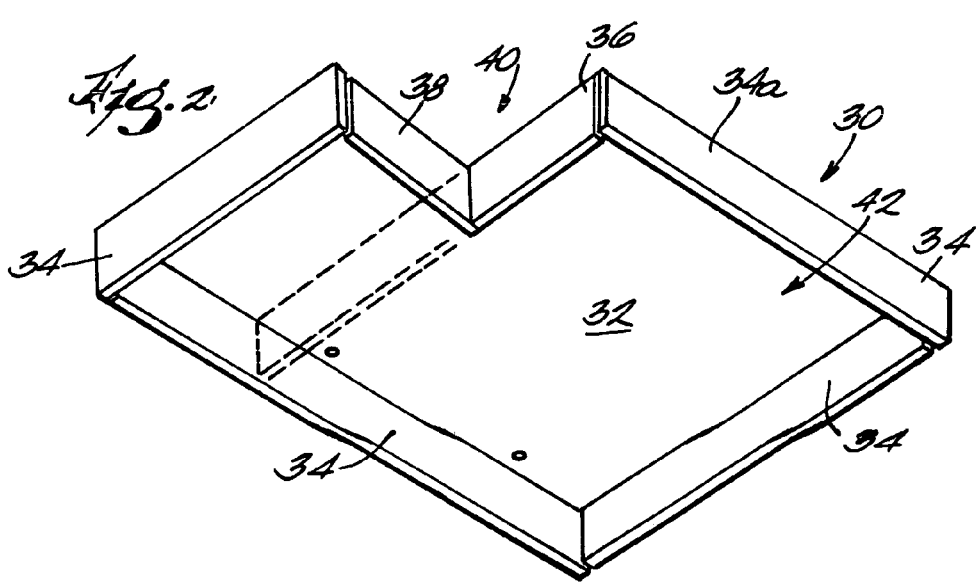

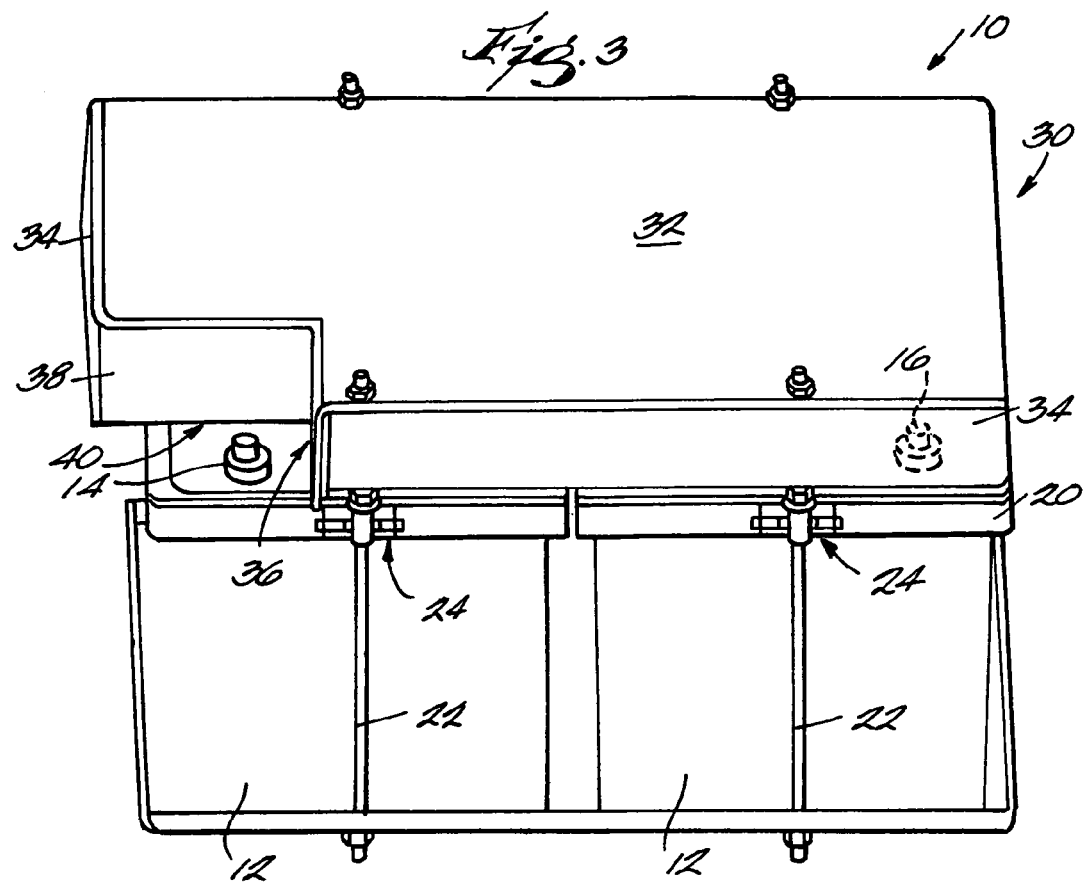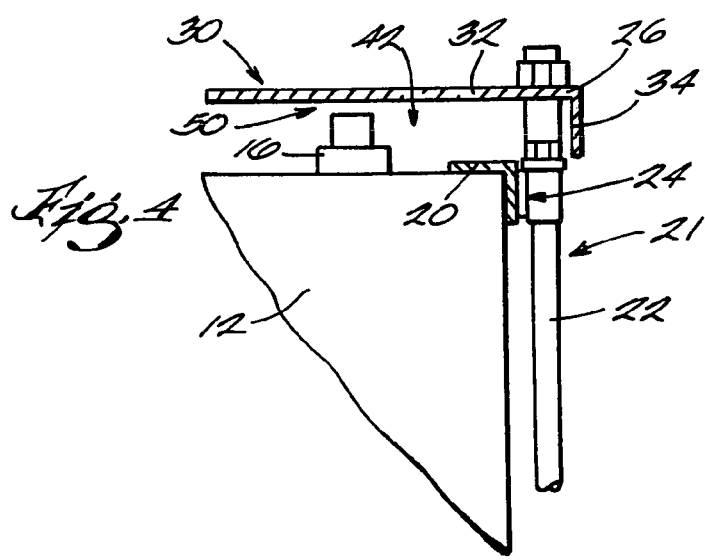

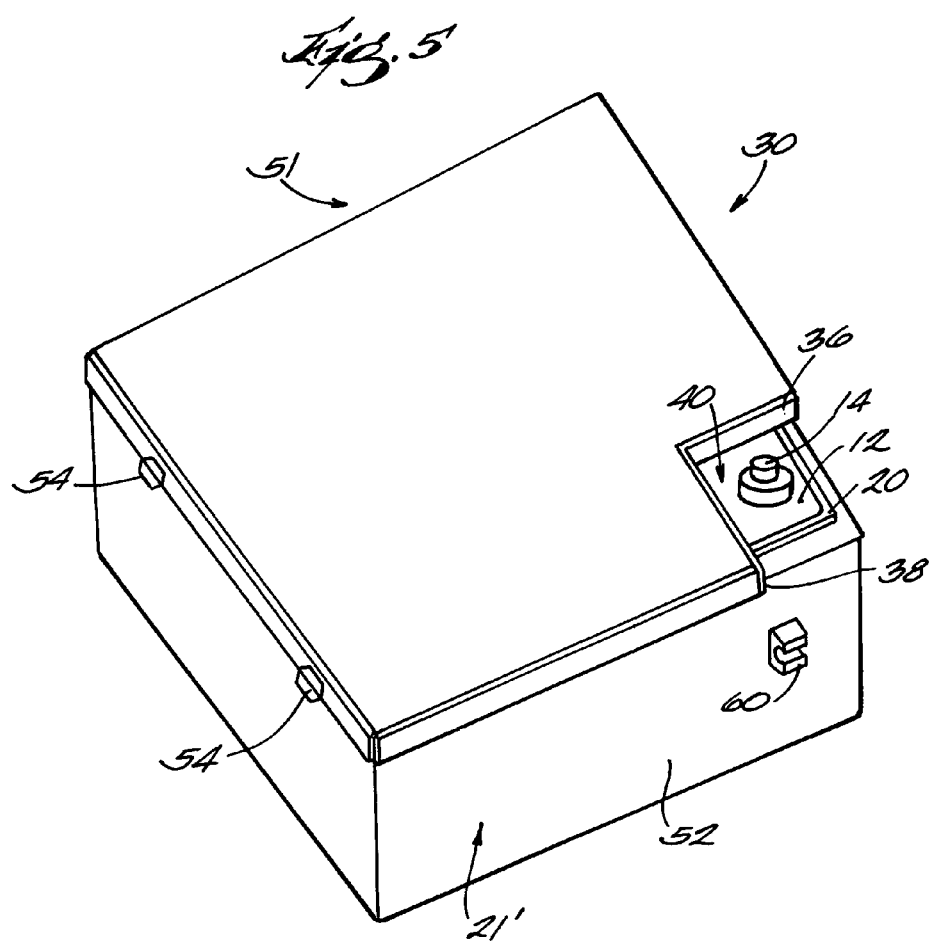

BATTERY COVER ASSEMBLY

BACKGROUND

The present invention relates to battery covers. Battery covers are often used to protect a battery from experiencing a short circuit. For example, tools and objects are often stored inside the housing of construction equipment, such as compressors and generators. If the battery terminals are uncovered, one of the tools or other objects could bridge between the battery terminals and cause a short circuit. To prevent such, prior art battery covers typically include a housing that defines a separate compartment that encloses the battery to exclude foreign objects from the area around the battery. The battery cover may include a hinged or bolted cover to provide access to the battery.

While these prior art devices generally protect the battery from exposure to foreign objects, accessing the battery may be difficult, especially if tools or other objects have been placed on top of the battery cover. Such inaccessibility makes it difficult to disconnect the battery during repair, disuse, or transport. Battery disconnection is desirable when the equipment is not in use to provide safety, preserve battery life and to prevent inadvertent starting of the equipment. The inaccessibility may cause an operator to forego disconnection of the battery even though such may be desirable. Furthermore, the enclosed battery housing must be opened for an operator to access the battery and confirm that the battery has been properly disconnected.

SUMMARY

The present invention relates to a battery cover assembly for use with a battery cell structure having spaced apart positive and negative terminals along a given surface. The cover assembly includes a cover surface having a relief area and a wall depending from the cover surface. A support structure is configured to support the cover surface relative to the given surface of a desired battery cell structure such that the open relief area is aligned with the negative terminal. The first wall extends between the positive and negative terminals and the cover surface covers the positive terminal. The cover assembly reduces the risk of an inadvertent short circuit while allowing easy access to the negative battery terminal.

In a further embodiment of the present invention, the depending wall extends substantially about the perimeter of the cover surface such that the depending wall defines a substantially closed area in which the positive terminal is segregated.

BRIEF DESCRIPTION OF THE DRAWINGS

FIG. 1 is a top, rear isometric view of a battery cover assembly according to a first embodiment of the present invention.

FIG. 2 is a bottom, front isometric view of a preferred battery cover according to the present invention.

FIG. 3 is a top, front oblique view of the battery cover assembly of FIG. 1.

FIG. 4 is a cross-sectional view along line 4—4 in FIG. 3.

FIG. 5 is a top, rear isometric view of a battery cover assembly according to a second embodiment of the present invention.

DETAILED DESCRIPTION OF THE PREFERRED EMBODIMENTS

The present invention will be described with reference to the accompanying drawing figures wherein like numbers represent like elements throughout. Certain terminology, for example, "top", "bottom", "right", "left", "front", "frontward", "forward", "back", "rear" and "rearward", is used in the following description for relative descriptive clarity only and is not intended to be limiting.

Referring to FIGS. 1 and 3, a battery cover assembly 10 that is a first embodiment of the present invention is shown. The battery cover assembly 10 is shown positioned about a pair of battery cells 12, one of the battery cells having a negative terminal 14 and the other cell 12 having a positive terminal 16 (see FIG. 3). The battery cells 12 are supported on a base surface 18. The base surface 18 may be a part of the battery cover assembly 10, or may be a separate structure, for example, a surface of the equipment in which the battery is utilized.

A support structure 21 extends between the base surface 18 and the battery cover 30. The support structure 21 of the first embodiment 10 includes a plurality of support rods 22 positioned about the battery cells 12. The support rods 22 are secured to the base surface 18 and are secured to and support, utilizing appropriate spacers 26 or the like (see FIG. 4), the battery cover 30. The support rods 22 are also preferably attached to a battery securing frame 20 that extends around the periphery of the battery cells 12 and holds the cells 12 relative to the base surface 18. Clips 24 or the like may be utilized to secure the frame 20 to the rods 22 (see FIG. 3).

Referring to FIGS. 1–3, the preferred battery cover 30 includes a cover surface 32 configured to substantially cover the battery cells 12, except for an open relief area 40 that is configured to align with the negative battery terminal 14. The size of the relief area 40 is preferably minimal such that the cover surface 32 protects as much of the battery cells 12 as possible while maintaining accessibility. However, the relief area 40 may be any desired size and shape, for example, the cover surface 32 covering only the positive terminal cell 12 and the relief area 40 being above all of the negative terminal cell 12. A side wall 34 depends from the cover surface 32 around its outer perimeter and inner walls 36 and 38 depend from the cover surface 32 about the relief area 40. The cover surface 32, side wall 34 and inner walls 36 and 38 define a substantially enclosed area 42. When the battery cover 30 is supported by the support assembly 21, the positive battery terminal 16 is segregated within the enclosed area 42 while the negative battery terminal 14 is accessible through the open relief area 40. As such, the likelihood of an object simultaneously contacting both terminals 14 and 16 and creating a short circuit is greatly reduced, if not eliminated. Even with the battery cover 30 in place, the negative battery terminal 14 remains accessible in the open relief area 40. As such, the negative battery cable (not shown) can easily be removed without removing the battery cover 30. Additionally, the open relief area 40 allows a quick visual inspection to confirm disconnection of the negative battery cable.

While the preferred embodiment includes a substantially enclosed area 42, such is not required. For example, the side wall 34 may be removed from the sides and back, with just the front side wall 34a and the inner walls 36 and 38 providing sufficient separation between the terminals 14 and 16. In yet another alternative, the complete side wall 34 and inner wall 38 are removed with inner wall 36 extending from the front edge to the back edge of the cover surface 32, as shown in phantom in FIG. 2. Additionally, while the walls 34, 36 and 38 preferably extend perpendicular to the cover surface 32, they may extend at various angles to accommodate various configurations. Furthermore, while the cover 30 components are shown as solid, substantially continuous surfaces, such is not required. For example, angled cooling slots may be provided along any of the surfaces 32, 34, 36, 38.

The battery cover 30 may be manufactured from a non-conductive material, for example, a plastic material. Alternatively, the cover 30 may be manufactured from steel or the like. In such case, it is preferred to provide a space 50, see FIG. 4, between the cover 30 surfaces 32, 34 and the positive battery terminal 16. The support structure 21 is configured to support the cover 30 at a desired spacing from the battery cells 12. The support structure 21 is preferably adjustable to allow the battery cover assembly 10 to be utilized with battery cells 12 of varying configurations.

Referring to FIG. 5, a battery cover assembly 51 that is an alternate embodiment of the present invention is shown. The battery cover assembly 51 includes a battery cover 30 substantially the same as in the previous embodiment. The support structure 21' in the present embodiment includes a walled housing 52 that completely encloses the sides and bottom of the battery cells 12. The battery cover 30 is hingedly connected to the housing 52 at hinges 54. The battery cover 30 has an open relief area 40 such that the cover assembly 51 operates in substantially the same manner as in the previous embodiment. A clip 60 is provided on the side of the housing 52 to maintain the negative battery cable (not shown) when it is disconnected from the battery terminal 14. A similar clip 60 can be utilized in the first embodiment, for example, by attaching the clip 60 to the battery cover side wall 34.

What is claimed is:

1. A battery assembly comprising:
   a battery cell structure having spaced apart positive and negative terminals along a given surface; and
   a battery cover assembly including:
   a cover surface having an open relief area and a wall depending from the cover surface;
   a support structure configured to support the cover surface relative to the given surface of the battery cell structure such that the open relief area is aligned with the negative terminal, at least a portion of the wall extends between the positive and negative terminals and the cover surface covers the positive terminal.

2. The battery assembly of claim 1 further including a base surface configured to support the battery cell structure.

3. The battery assembly of claim 2 wherein the support structure includes a plurality of support rods extending between the base surface and the cover surface.

4. The battery assembly of claim 1 wherein the support structure includes a plurality of support rods extending between the cover surface and a surface supporting the battery cell structure.

5. The battery assembly of claim 4 wherein the surface supporting the battery cell structure is part of a piece of equipment utilizing the battery cell structure.

6. The battery assembly of claim 1 wherein the support structure is a housing configured to surround the battery cell structure except for the given surface.

7. The battery assembly of claim 1 wherein the negative terminal of the battery structure has a given planar area and the open relief area has an area greater than the given planar area.

8. The battery assembly of claim 1 wherein the cover surface is spaced from the positive terminal of the battery cell structure.

9. The battery assembly of claim 1 wherein the cover surface has a given perimeter and the wall extends about the given perimeter to define a substantially enclosed area about the positive terminal.

10. The battery assembly of claim 1 wherein the wall is substantially perpendicular to the cover surface.

* * * * *